No. 852,347. PATENTED APR. 30, 1907.
E. F. PRICE.
PROCESS OF PRODUCING LOW CARBON FERRO ALLOYS.
APPLICATION FILED NOV. 14, 1905.

Witnesses:
J. B. Hill
L. A. Skinner

Inventor:
Edgar F. Price,
by Byrnes & Townsend,
Att'ys.

UNITED STATES PATENT OFFICE.

EDGAR F. PRICE, OF NIAGARA FALLS, NEW YORK.

PROCESS OF PRODUCING LOW-CARBON FERRO ALLOYS.

No. 852,347. Specification of Letters Patent. Patented April 30, 1907.

Application filed November 14, 1905. Serial No. 287,353.

*To all whom it may concern:*

Be it known that I, EDGAR F. PRICE, a citizen of the United States, residing at Niagara Falls, in the county of Niagara and State of New York, have invented certain new and useful Improvements in Processes of Producing Low-Carbon Ferro Alloys, of which the following is a specification.

This process is designed for the production of low-carbon ferrochromium, ferromanganese, ferrotitanium, ferrovanadium and similar alloys, and contemplates the use of ferrosilicon as a reducing agent. It is possible to electrically produce this silicid with a silicon content of fifty percent and upward and very low in carbon.

According to the present invention the production of low-carbon ferro-alloys is effected by a continuous operation comprising two stages. In the first stage ferrosilicon high in silicon and low in carbon is produced by electrically smelting a charge of silica, iron ore or iron and carbon. The molten silicid is then run into a second furnace or into another compartment of the same furnace and is there employed to effect the reduction of an ore of the metal whose ferroalloy is desired. A basic flux such as lime is preferably employed to convert the silica produced by the reaction of the silicid on oxid ores into a fusible slag.

Suitable apparatus for carrying out the process is shown in the accompanying drawings, in which—

Figure 1:
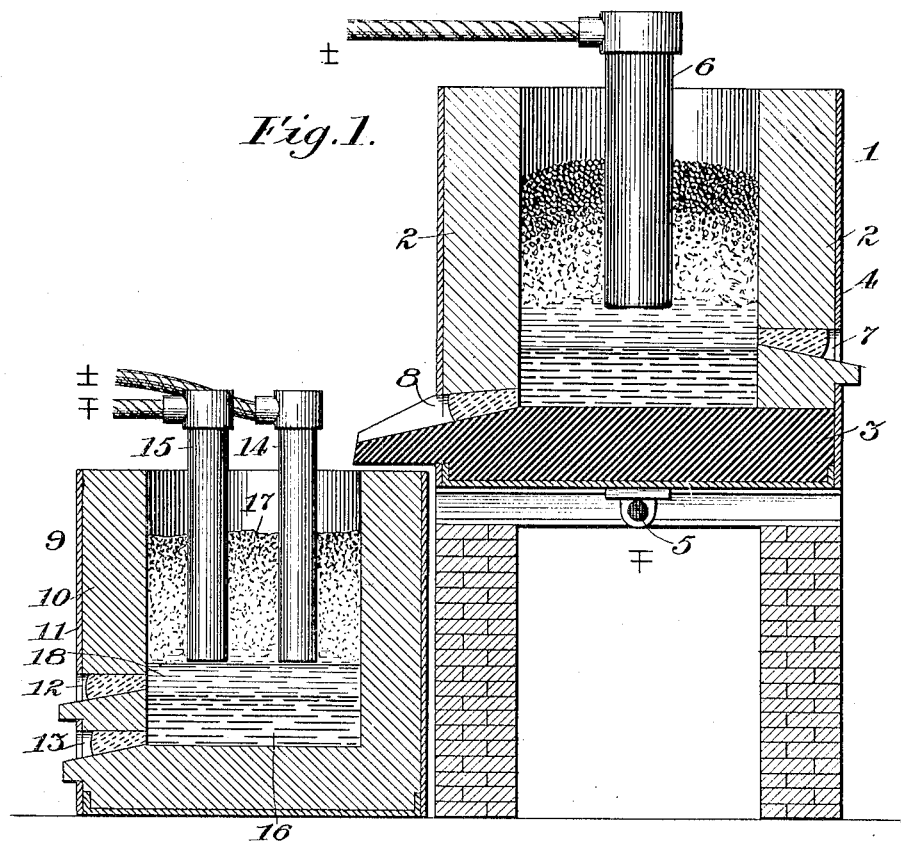
Figure 2:
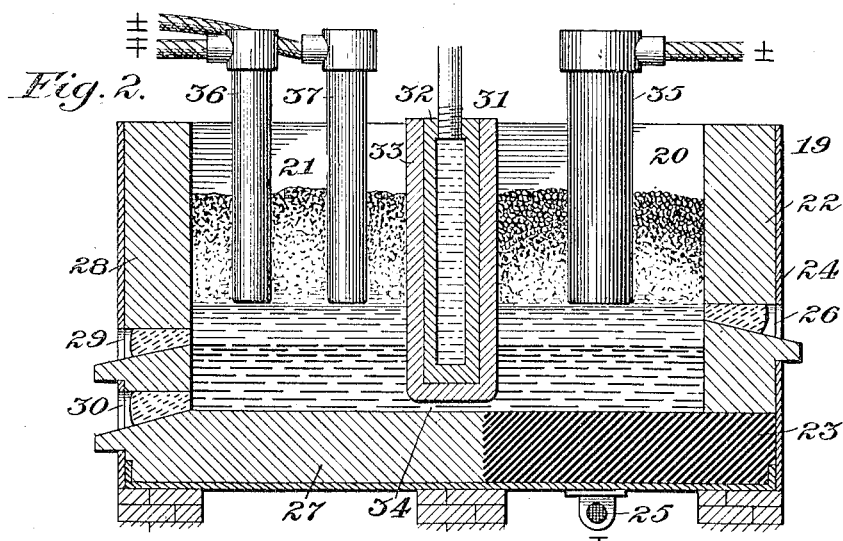

Figure 1 is a transverse vertical section of separate electric furnaces for producing and utilizing the ferrosilicon; and Fig. 2 is a transverse vertical section of an electric furnace having separate communicating compartments for producing the ferrosilicon and utilizing it to effect reduction.

The smelting-furnace 1 shown in Fig. 1 comprises sides 2 of refractory electrically-nonconductive material, such as carborundum, siloxicon or silica, or of carbon, and a hearth 3 of carbon, surrounded by a metal casing 4 having an electric terminal 5. The carbon hearth constitutes one electrode. The other electrode is a depending carbon rod 6. Tap-holes 7, 8 for slag and metal extend through the side walls at different heights. In using this furnace to carry out the first stage of the process, an arc is established between the depending electrode and the carbon hearth, and the charge, for example a mixture of finely ground silica, iron ore and coke, the silica and carbon preferably being in relatively large amount, is fed into the furnace. As the charge is reduced, molten ferrosilicon collects in the bottom of the furnace and is run from time to time through the tap-hole 8 into the reduction furnace 9. More of the charge-mixture is then fed into the smelting furnace.

The reduction furnace 9 comprises a body 10 of refractory material, preferably chromite or magnesia, surrounded by a metal casing 11. Superposed tap-holes 12, 13 extend through the lower part of the furnace. Carbon-rod electrodes 14, 15 of opposite polarity depend into the furnace.

In the second stage of the process, ferrosilicon is tapped from the furnace 1 into the furnace 9 to provide a molten layer 16. Arcs are then established between the lower ends of the electrodes 14, 15 and this body of ferrosilicon, and a charge 17 containing the ore to be reduced, for example a mixture of chromite and lime or other basic flux, is fed into the furnace. The silicon in the molted silicid effects the reduction of the chromite and is converted into silica, which combines with the lime to produce a fusible slag. The reduced chromium and iron alloy with the residual iron of the silicid and the slag accumulates upon the molten alloy as a floating layer 18. When this reaction is finished, sufficient chromite being present to insure the oxidation of substantially all of the silicon, the slag and alloy are withdrawn through the tap-holes 12, 13. More of the ferrosilicon is then tapped from the furnace 1, percolating through the hot unreduced charge in the furnace 9. The second stage of the process may be conducted in a continuous manner by retaining a pool of metal in the furnace 9, maintaining the arcs, and supplying the charge and molten ferrosilicon and withdrawing the slag and ferro-alloy as required.

The furnace 19 shown in Fig. 2 has separate communicating compartments 20, 21 for producing and utilizing the ferrosilicon. The smelting compartment 20 has nonconducting sides 22 and a hearth 23, of carbon, surrounded by a metal casing 24 having an electric terminal 25. The carbon hearth constitutes one electrode. A tap-hole 26 for slag extends through the end wall. The reduction-compartment 21 has a bottom 27 and outer walls 28 of nonconducting material, preferably chromite or lime. Superposed lateral tap-holes 29, 30 extend through the end wall. The compartments 20, 21 are partially separated by a transverse wall 31, which depends nearly to the bottom of the furnace. This wall preferably consists of a steel casting 32, having a chamber for the circulation of water and an outer facing 33 of refractory material. A passage 34 beneath the wall 31 connects the compartments 20, 21. A carbon-rod electrode 35 of opposite polarity to the terminal 25 depends into the smelting-compartment. Two carbon-rod electrodes 36, 37 of opposite polarity depend into the reduction-compartment. In using this furnace to carry out the process, the charge of silica, iron ore and coke is smelted in the compartment 20 by an electric current passing between the electrode 35 and the carbon hearth 23. If the charge contains impurities, any resulting slag is withdrawn through the tap-hole 26 and the ferrosilicon runs through the passage 34 into the compartment 21. The reduction of the charge in this compartment is effected precisely as in the separate furnace 9, heretofore described, and the resulting slag and ferro-alloy are withdrawn through the tap-holes 29, 30. The process is thus carried out in a continuous manner, the charge-mixture being supplied to each compartment and the slags and ferro-alloy being withdrawn as required.

This process enables a ferro-alloy containing a minimum or predetermined low percentage of carbon to be continuously produced at a relatively low cost, the use of a charge containing a relatively large amount of silica and carbon producing a silicid low in carbon and serving as an effective reducing agent.

Arc or incandescence furnaces may be employed for carrying out either or both stages of the process, and the charge, when of sufficiently high conductivity, may constitute a resistance conductor.

I claim:—

1. The process of producing ferro-alloys, which consists in producing ferrosilicon by smelting a suitable charge, removing the molten silicid from the smelting zone and bringing it in contact with a compound of a metal reducible by silicon and alloyable with iron, as set forth.

2. The process of producing ferro-alloys, which consists in producing ferrosilicon by electrically smelting a charge containing silica, carbon and a source of iron, removing the molten silicid from the smelting zone and bringing it in contact with a compound of a metal reducible by silicon and alloyable with iron, and supplying heat to facilitate the reduction of said compound, as set forth.

3. The process of producing ferro-alloys, which consists in producing ferrosilicon by electrically smelting a charge containing silica, carbon and a source of iron, removing the molten silicid from the smelting zone and bringing it in contact with a compound of a metal reducible by silicon and alloyable with iron, and electrically supplying heat to facilitate the reduction of said compound, as set forth.

4. The process of producing low-carbon ferro-alloys, which consists in producing ferrosilicon high in silicon and low in carbon by smelting a charge containing silica, carbon and a source of iron, the silica and carbon being in relatively large amount, removing the molten silicid from the smelting zone and bringing it in contact with a compound of a metal reducible by silicon and alloyable with iron, and supplying heat to facilitate the reduction of said compound, as set forth.

5. The process of producing ferro-alloys, which consists in producing ferrosilicon by smelting a suitable charge, removing the molten silicid from the smelting zone and bringing it in contact with an oxid of a metal reducible by silicon and alloyable with iron, and providing a basic flux to slag the resulting silica, as set forth.

6. The process of producing low-carbon ferro-alloys, which consists in producing ferrosilicon high in silicon and low in carbon by smelting a charge containing silica, carbon and a source of iron, the silica and carbon being in relatively large amount, removing the molten silicid from the smelting zone and bringing it in contact with an oxid of a metal reducible by silicon and alloyable with iron, providing a basic flux to slag the resulting silica, and supplying heat to facilitate the reduction of said compound, as set forth.

7. The process of producing ferro-alloys, which consists in producing ferrosilicon by smelting a suitable charge, removing the molten silicid from the smelting zone and bringing it in contact with an oxid of a metal reducible by silicon and alloyable with iron, providing a basic flux to slag the resulting silica, and withdrawing the slags and ferro-alloy and supplying fresh charge-materials as required, as set forth.

8. The process of producing low-carbon ferro-alloys, which consists in producing ferrosilicon high in silicon and low in carbon by smelting a charge containing silica, carbon and a source of iron, the silica and carbon being in relatively large amount, removing the molten silicid from the smelting zone and bringing it in contact with an oxid of a metal reducible by silicon and alloyable with iron, providing a basic flux to slag the resulting silica, supplying heat to facilitate the reduction of said compound, and withdrawing the slags and ferro-alloy and supplying fresh charge-materials as required, as set forth.

In testimony whereof, I affix my signature in presence of two witnesses.

EDGAR F. PRICE.

Witnesses:
G. E. Cox,
D. Burgess.